United States Patent [19]
Hegg et al.

[11] Patent Number: 5,640,479
[45] Date of Patent: Jun. 17, 1997

[54] FIBEROPTIC FACE PLATE STOP FOR DIGITAL MICROMIRROR DEVICE PROJECTION SYSTEM

[75] Inventors: Ronald Hegg, Vista; Steven E. Shields, San Diego, both of Calif.

[73] Assignee: Palomar Technologies Corporation, Carlsbad, Calif.

[21] Appl. No.: 546,582

[22] Filed: Oct. 18, 1995

[51] Int. Cl.$^6$ ............................... G02B 6/04; G02B 5/08
[52] U.S. Cl. ............................... 385/120; 385/18; 359/225; 359/291; 359/855; 359/865
[58] Field of Search ............................... 385/18, 19, 33, 385/89, 120, 117, 118, 115, 116, 119; 359/291, 853, 855, 865, 866, 224, 225

[56] References Cited

U.S. PATENT DOCUMENTS

| | | | |
|---|---|---|---|
| 4,838,631 | 6/1989 | Chande et al. | 359/201 |
| 5,199,088 | 3/1993 | Magel | 385/18 |
| 5,319,726 | 6/1994 | Abney | 385/26 |
| 5,345,521 | 9/1994 | McDonald et al. | 385/18 X |
| 5,517,347 | 5/1996 | Sampsell | 359/224 |

OTHER PUBLICATIONS

Younse, Jack M., et al.; "Mirrors on a Chip"; IEEE Spectrum; Nov. 1993; pp. 27–31.

Tew, Claude, et al.; "Electronic Control of a Digital Micromirror Device for Projection Displays"; IEEE International Solid State Circuits Conference; 1994; pp. 130–132, 98–99 and 273.

Hornbeck, Larry J.; "Current Status of the Digital Micromirror Device (DMD) for Projection Television Applications"; International Electronic Devices Meeting; Dec. 5–8, 1993. (copy not enclosed).

*Primary Examiner*—Rodney B. Bovernick
*Assistant Examiner*—Hemang Sanghari
*Attorney, Agent, or Firm*—Rodney F. Brown

[57] ABSTRACT

A digital micromirror device projection system employs an array of digitally operable micromirrors that are individually and selectively tiltable between ON and OFF positions. The array of mirrors is illuminated by a high intensity light source, and light reflected from those mirrors selectively driven to the ON tilted position is reflected to a projection lens for projection onto a screen. Concomitantly, light reflected from those of the mirrors in the OFF position are blocked by a system stop. The system stop is formed by a wedge-shaped bundle of optical fibers positioned immediately adjacent the mirror array. The fiber axes are all mutually parallel and are perpendicular to the mutually parallel planes of those of the mirrors that are tilted to the ON position so that the illuminating light is incident upon the mirrors in a perpendicular relationship and is retroreflected back through the optical fibers to the projection lens of the system. The optical fibers have a very small numerical aperture and act as a system stop to block light from those mirrors that are in OFF position. Light from the illuminating source passing through the fiberoptic face plate and impinging upon the OFF position mirrors is reflected back at an angle to the axes of the fibers that is not within the acceptance angle of the fibers.

15 Claims, 3 Drawing Sheets

FIBEROPTIC FACE PLATE STOP FOR DIGITAL MICROMIRROR DEVICE PROJECTION SYSTEM

BACKGROUND OF THE INVENTION

1. Field of the Invention

The present invention relates to digital micromirror device projection systems, and more particularly concerns such systems having an improved optical stop.

2. Description of Related Art

Many applications require electronically defined images to be projected on large screen with high brightness, high resolution and in black-and-white or full color. Several technologies utilized for this purpose are currently known in the art, including cathode ray tubes, active matrix transmissive liquid crystal light valves, photo-activated reflective liquid crystal light valves, and light modulators that work by deflecting part of the light falling onto them, such as digital micromirror displays (DMD).

Cathode ray tube devices are best known and most prevalent. They are used for numerous applications, including television displays and computer monitors. A cathode ray tube can be described as consisting of an electron gun to produce a beam of electrons, focus and deflection circuitry to paint the electrons onto a series of points on a face plate, and a phosphorescent face plate screen. The impact of the electrons onto the molecules of the phosphor in the screen generates photons and images formed by electronically controlling how many electrons land at each point on the screen over a given period of time.

For those color applications where the screen can be viewed directly, three electron guns are generally packaged within one cathode ray tube in a manner such that the electrons from each gun impact only the phosphor of the color associated with its contribution to the image red, green or blue. For those applications requiring large illuminous flux to achieve high brightness on a large screen, three cathode ray tubes are generally used so as to maximize available brightness. Unfortunately, there is still a limit to the maximum brightness attainable in a cathode ray tube as the intensity of the electron beams cannot be increased past the point where the phosphor screens are damaged.

Light valve projectors use a spatial light modulator to impart spatial and temporal modulation to light from a high intensity source. In a liquid crystal light valve electrical voltage is applied across the liquid crystal to modulate the polarization of the optical wave front from a high intensity illuminating light source. By subsequently passing the modulated light through another polarizer, often called an "analyzer", one can obtain a light beam whose intensity is related to the applied electrical voltage. In other light valves, tilting mirrors or other mechanical means are used to control whether or not light from the illuminating lamp passes through a system aperture stop and onto the screen.

In liquid crystal light valves the electrical voltage applied across the thin film of liquid crystal material is modulated spatially and temporally so as to change the optical properties of the liquid crystal material as a function of its location at any given instant in time. In an active matrix liquid crystal light valve, the most prevalent type of liquid crystal display at the present time, row and column electrodes are used to channel the electrical signals to the appropriate location at the desired point in time, in a photo activated light valve, also known as an image light amplifier, a device expressly designed for projection applications, the phosphor screen image of a cathode ray tube is re-imaged onto a photoconductor, which in turn controls the electrical voltage applied across the film of liquid crystal material. Unfortunately, liquid crystal light valve projectors are complex to manufacture, and the analog nature of the light modulation process makes it difficult to achieve high spatial and temporal uniformity.

There have been several proposals for using a micromachined device built on a silicon integrated circuit as a light valve. One example of such a device is the digital micromirror device (DMD). In one embodiment the DMD consists of a complementary metal oxide semiconductor (CMOS), static random access memory (RAM) chip with an array of mirrors mounted over the surface of the chip such that there is a one to one relationship between each memory cell and a mirror. Each mirror has a deformable mount such that the mirror can be selectively tilted to either one of two stable positions depending on the data stored in the corresponding memory cell. In the ON position, for example, a mirror is tilted to allow light incident on the array to pass through an aperture for projection onto a screen. In the OFF position the mirror is not tilted, and the incident light is reflected away from the projection aperture. Hence, by programming the tilt of each mirror in the array of mirrors as a function of time, spatial and temporal modulation may be imparted to the otherwise uniform illumination from the light source. With a suitable lens the light reflected by the array of mirrors may be focused onto a screen for viewing.

Digital micromirror device projection systems are described, for example, in an article entitled "Mirrors on a Chip", by Jack M. Younse, on pages 27 through 31, of the *IEEE Spectrum* of November 1993, and in an article entitled "Electronic Control of a Digital Micromirror Device For Projection Displays" by Clause Tew, et al., on pages 130 through 131 of *IEEE International Solid State Circuits Conference* 1994, identified as ISSCC 94/Session Seven/Tech. Directions: Nanoelectronics, Super Conductivity, Optics/Paper TA7.5. These devices are also described in a paper presented at the International Electronic Devices Meeting, Washington, D.C., Dec. 5–8, 1993, by Larry J. Hornbeck of Texas Instruments entitled "Current Status of the Digital Micromirror Device (DMD) For Projection Television Applications". These articles and papers are incorporated herein by this reference as though fully set forth.

In these prior systems the illuminating light is directed at the mirror array along an axis making a first angle with respect to the plane of the array, and the projection lens is positioned to receive light reflected along an axis directed at a different angle with respect to the plane of the array and reflected from those mirrors in ON tilted position. Light reflected from those mirrors in the OFF tilted position is reflected away from the projection lens aperture. A Schlieren stop is physically mounted in the projection lens system to minimize entry of unwanted light into the projection lens. In this system light enters and exits the mirror array on different axes, and the zoom projection lens acts as a Schlieren stop by accepting only light from one of the mirror orientations.

Because of the different angles of the axes of the illumination light and the reflected projection light, the image plane formed by the mirror array is not perpendicular to the direction of light traveling through the projection system. Effectively, the image plane is tilted relative to the projection system, thus degrading focus, color purity and causing shape distortion.

The need to employ a relatively large aperture stop in the prior system results in collection of some unwanted light, and thus may degrade contrast. Because the illumination beam and outgoing image beam are oriented at different angles with respect to the array and are effectively side-by-side in the prior system, the projection lens must be spaced by a relatively large distance from the image plane, thus requiring a larger lens with a longer focal length, all of which results in an undesirably large system package.

Accordingly, it is an object of the present invention to provide a tiltable mirror projection system which avoids or minimizes above-mentioned problems.

SUMMARY OF THE INVENTION

In carrying out principles of the present invention in accordance with a preferred embodiment thereof, there is provided an imaging system comprising an array of mirrors each mounted for tilting between an OFF position in which the mirror lies in a mirror plane that is parallel to a first plane and an ON position in which the mirror lies in a mirror plane that is parallel to a second plane that itself extends at an angle to said first plane. A bundle of mutually parallel optical fibers having optical fiber axes perpendicular to the second plane is positioned to direct illuminating input light through the fibers to the array of mirrors and to direct retroreflected light from the mirrors in the ON position back through the fibers so that the fibers will block light reflected from mirrors in said OFF position. The system includes an illuminating light source and a projection lens all arranged so that the incoming illuminating light and the retroreflected outgoing light are coaxial or substantially coaxial at points in the optical paths closely adjacent to the mirror array. In a specific embodiment the optical fibers are bundled together with a plurality of interspersed nonconductive or black fibers or black clad fibers and arranged in a solid wedge shape in which one face of the wedge is adjacent to and parallel to the plane of the array, and the other face of the wedge remote from the array is parallel to the planes of all of those mirrors in the ON position. This arrangement causes the straight optical axes of the fibers, which extend in straight lines between the faces of the wedge to be effectively perpendicular to the plane of those mirrors tilted to the ON position. The mirror array image is formed at a base of the fiberoptic feed plate that is perpendicular to the projection axis, thereby improving focus and color purity, and minimizing shape distortion such as keystoning. Each optical fiber has a small numerical aperture so as to effectively provide one or more very small aperture stops for each mirror.

DESCRIPTION OF PREFERRED EMBODIMENTS

A projection display system employing digital micromirrors is described in an article entitled "Mirrors on a Chip" by Jack M. Younse, published in the November 1993 issue of *IEEE Spectrum, pages* 27 through 31.

Figure 1:
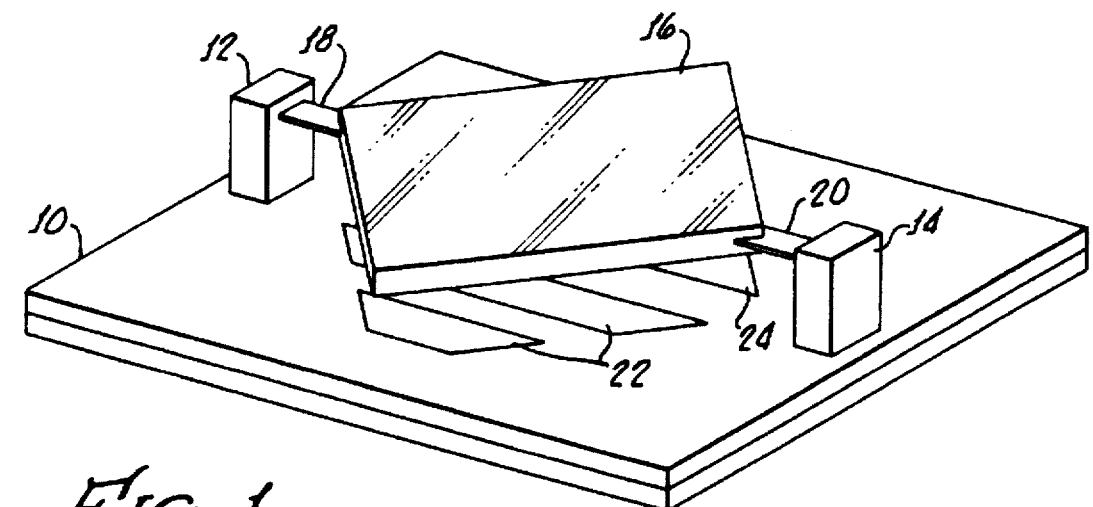
FIG. 1 is a greatly enlarged illustration of a single micromirror pixel of a digital micromirror device chip.

Briefly, the display system described in this article embodies an image-forming substrate on which are formed hundreds of thousands of micromirrors, of which a single one is illustrated in FIG. 1. Upon a silicon substrate 10 is formed a pair of support posts 12,14, from which a reflective mirror element 16 is tiltably suspended by a pair of torsion hinges 18,20 extending between opposite corners of the mirror element and respective ones of the support posts. Address electrodes 22,24 are formed on the silicon substrate beneath the chip and are selectively energized to effectively provide a bi-stable operation. With no signal on the electrodes the mirror is in its effective quiescent state and has its reflective plane lying parallel to the substrate, which is effectively the plane of the array of the many closely adjacent mirrors. Each mirror is tilted to one or the other of its bi-stable states by energization of the electrodes, so that the aluminum alloy mirror will tilt 10° from its quiescent state in a first direction by torsion of the hinges, or 10° from its quiescent state in the other direction. Thus the mirrors of the array are mounted for tilting between a first position, which may be termed an "OFF" position, in which each mirror lies in a plane that is parallel to a first plane extending at an angle of about 10° to the plane of the array. With a reverse voltage applied to the electrodes, each mirror is tilted through 10° from its quiescent position in the opposite direction so that each lies in a plane which may be termed an "OFF plane" that is parallel to a second plane that extends at an angle of 10° to the plane of the array and to the plane of the quiescent position of the mirrors.

Figure 2:
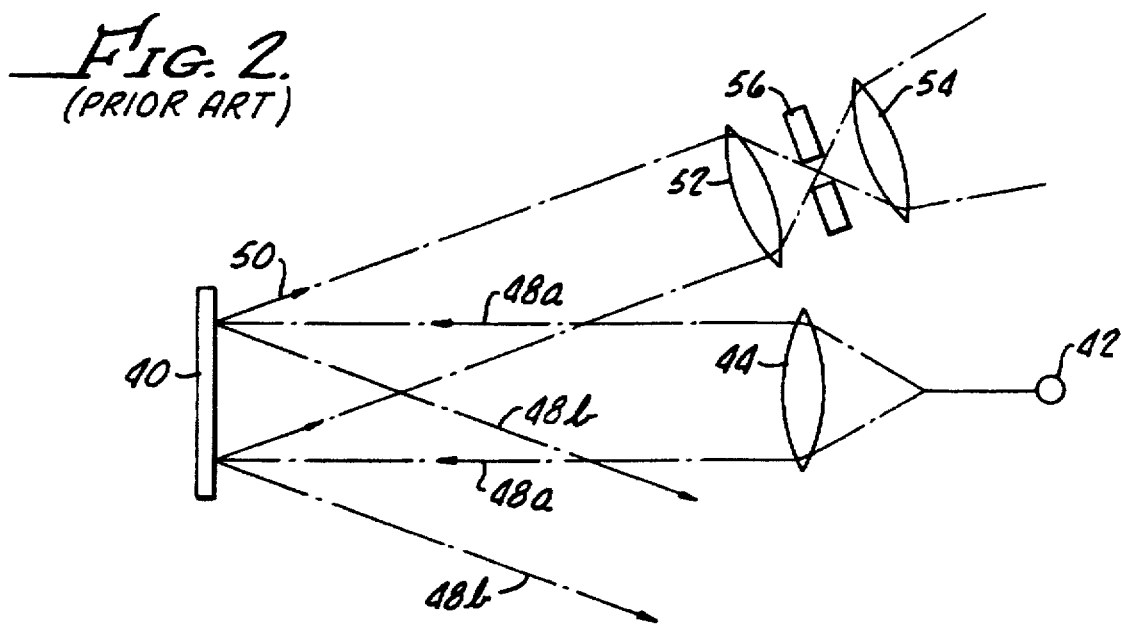
FIG. 2 schematically depicts a projection system of the prior art utilizing an array of digital micromirror devices.

A prior art projection system employing an array of such digital micromirror devices (DMD) is illustrated in FIG. 2, wherein a DMD array 40 is illuminated by light provided from a light source 42 that is fed through collimation optics 44, as indicated by collimated beam 48a, for reflection as indicated by collimated beam 50 (from those mirrors in ON position) through a projection lens, including lens elements 52,54, for illumination of a large screen (not shown). Light reflected from mirrors in the off position is indicated by beam 48b.

The system of FIG. 2 employs a Schlieren stop 56 physically located in the projection lens system. The stop prevents unwanted reflections from the mirror array from passing through the projection lens to the screen. The Schlieren stop is required in this prior art system for enhancing contrast ratio and to ensure that only the desired light, reflected from those of the mirrors in the ON position at any given instant, is transmitted through the projection lens.

Figure 3:
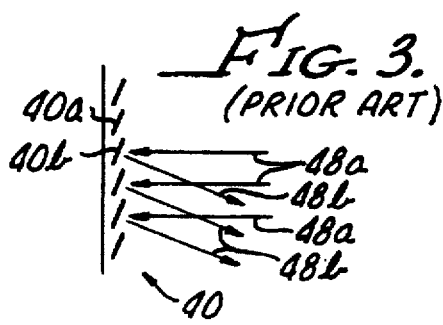
FIG. 3 illustrates the paths of light to and from mirrors tilted to the OFF position in the prior art display of FIG. 2.

FIG. 3 schematically depicts operation of the mirror array of the system of FIG. 2 for all mirrors in the OFF position. The array 40 includes a plurality of mirrors 40a, 40b, etc., all of which are presumed in this illustration to be in OFF position and thereby all tilted in a first direction at 10° quiescent pescent position, which quiescent position is parallel to the plane of the array. In this system the incoming light source is arranged to be transmitted along an axis that is perpendicular to the plane of the array. Thus, incoming light rays indicated at 48a, for example, are reflected by the OFF position mirrors, as indicated by light rays 48b. The light from the mirrors in the OFF position are reflected away from the projection lens, and thus does not participate in the forming of any projected image.

Figure 4:
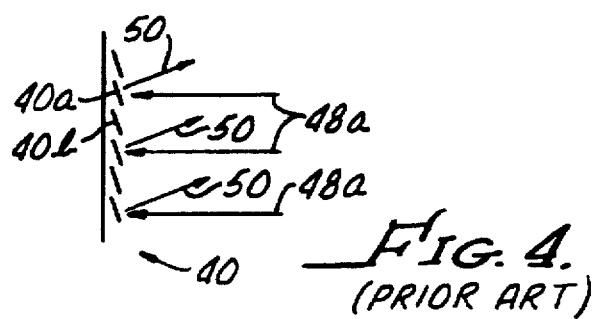
FIG. 4 illustrates the paths of light to and from mirrors tilted to the ON position in the prior art system of FIG. 2.

FIG. 4 shows the array 40 of the system of FIG. 2 with the mirrors 40a,40b, etc. all tilted to lie in planes parallel to a plane that lies at 10° in the opposite direction with respect to the quiescent plane, which is the plane of the array. In this system the axis of the projection lens is arranged to be perpendicular to the plane of those mirrors that are tilted to the ON position. Accordingly, an incoming light ray 48a is reflected along the axis of the projection lens system, as indicated by reflected light ray 50 of FIG. 4. Assuming the mirrors in stable ON and OFF positions are at plus 10° and minus 10°, respectively, with respect to the plane of the array, namely the quiescent position, the angle between the reflected ray 48a, as reflected from an OFF state mirror, and the reflected ray 50, as reflected from an ON state mirror, is about 40°. Despite this separation, some arrangement is necessary to prevent light reflected from mirrors in the OFF state, as well as from other parts of the structure such as the hinges 18,20, from passing through the lens system. For this reason the prior art system employs a Schlieren stop in the lens system itself.

The simplified showing of FIG. 2 illustrates a single color system. For a full color system a color filter wheel (not shown) is interposed between the collimation optics 44 of the light source and the mirror array miniature image source 40, so that three successive images in the three primary colors can be successively reflected to the projection lens.

It will be observed from the illustration of FIGS. 2, 3 and 4 that the input light axis and output projection light axis are necessarily positioned at significant angles relative to one another, which may be in the order of 20° or more, and, further, that the output projection axis necessarily extends at an angle to the image-forming plane of the mirror array. The image plane, which is the plane of the array, is not perpendicular to the axis of the projection lens. This may introduce problems with focus, color purity and keystone distortion of the projected display.

Further, because of the need to effectively locate the incoming and projection light lens systems in a side-by-side arrangement along the optical path, laterally adjacent to one another, each must be displaced from the plane of the mirror array to provide sufficient physical space for the two lens systems. This increases the required focal length and, therefore, the size of the resulting package.

Figure 5:
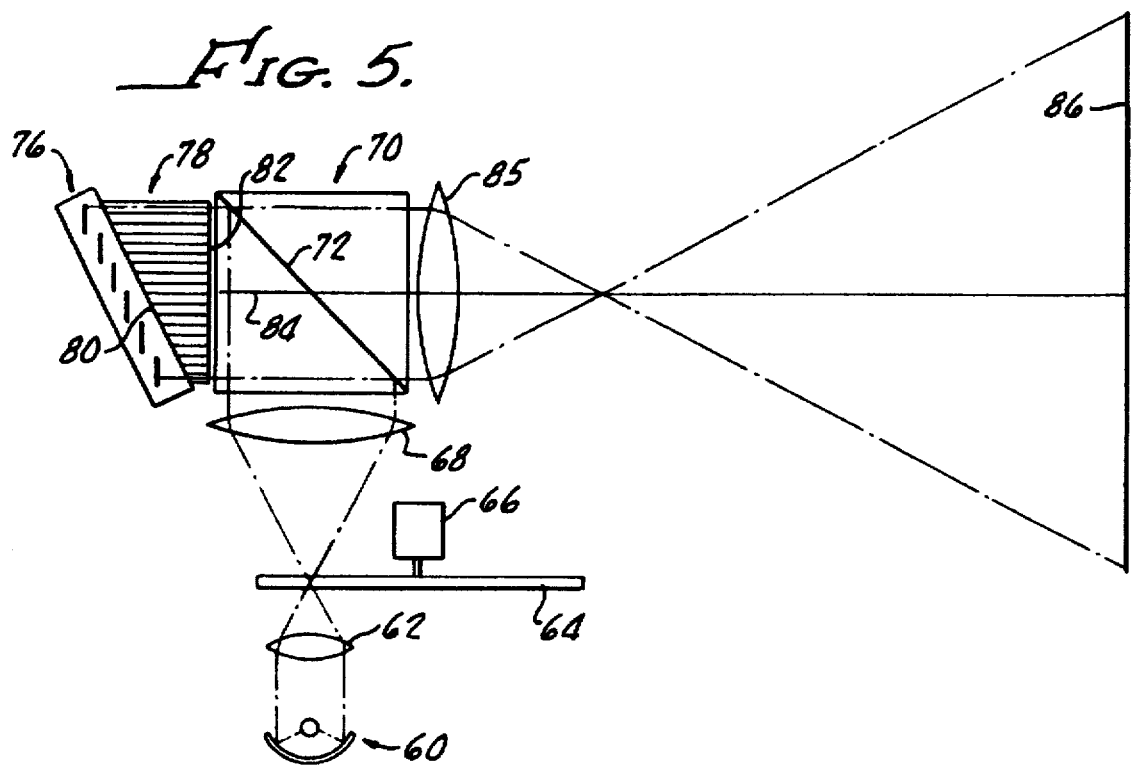
FIG. 5 shows a digital micromirror device projection system embodying principles of the present invention.

A system embodying principles of the present invention, as illustrated in FIG. 5, avoids many of the problems of the prior art DMD projection system. In the embodiment of a projection system incorporating the present invention, as shown in FIG. 5, a light source 60 transmits light through a condenser lens system 62, at the focal point of which is positioned a color filter wheel 64 rotated by a motor 66 so that light of different colors, red, green and blue, is successively projected through the color filter wheel to a collimating lens 68. Illuminating light projected from the light source passing through the collimating lens is fed to a light separator 70, which may take the form, in this particular embodiment, of a dichroic mirror or beam-splitting prism having a reflective surface 72 which bends the incoming light at 45° and transmits the illumination to an array of mirrors, such as a digital micromirror device 76. The micromirror device is the same as that of the previously described prior art.

Interposed between incoming illumination light from beam separator 70 and the mirror array 76 is a wedge 78 composed of a bundle of closely packed optical fibers. The fiber optic bundle 78 forms a face plate for the mirror array which is wedge-shaped, as indicated, having an inner surface or face 80 positioned at and lying along the surface of the mirror array and having an outer surface or face 82 that lies in a plane that extends perpendicular to the axis 84 of the illumination light that is reflected from separator surface 72. This axis 84, it may be noted, is coincident with the axis of the projection lens system 85. The projection lens system is positioned adjacent one side of the separator 70 to receive light reflected from the mirror array 76, through the fiber optic face plate 78, and through the surface 72 of the separator 70. The light from the projection lens is imaged upon a suitable display screen 86.

The fiberoptic bundle 78 comprises a bundle of straight optical fibers, each having a narrow acceptance angle, with a numerical aperture of 0.35, for example, and each extending in a straight line between the inner bundle face 80 and the outer bundle face 82. If deemed necessary or desirable, the light transmitting optical fibers of the wedge-shaped bundle or face plate 78 may be interspersed in the bundle with black non-transmissive fibers.

Figure 6:
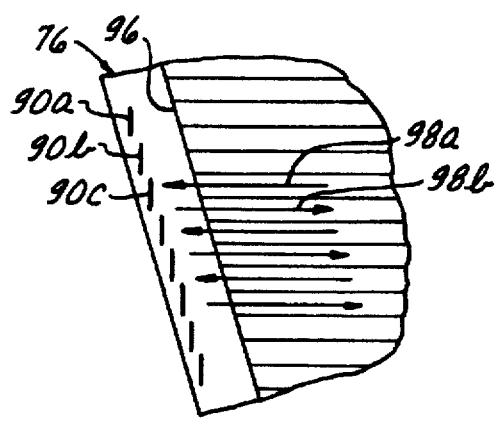
FIG. 6 is an enlarged view of a portion of the mirror array of the system of FIG. 5, showing the paths of light to and from those mirrors tilted to ON position.
Figure 7:
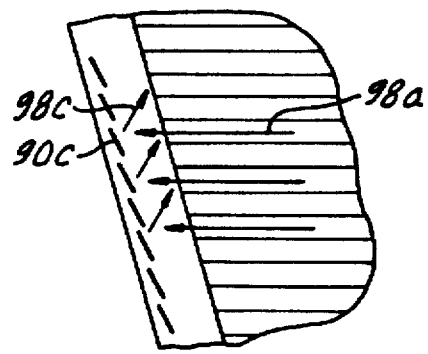
FIG. 7 is an illustration similar to that of FIG. 6 showing paths of light to and from those mirrors tilted to the OFF position.

FIGS. 6 and 7 illustrate the paths of light from a light source passing through the fiberoptic wedge-shaped bundle in the ON position of the mirrors of the mirror array (FIG. 6) and in the OFF position of the mirrors (FIG. 7). FIG. 6 illustrates the mirrors, such as mirrors 90a,90b, etc., of the array with all of the mirrors tilted 10° to the ON position. The axes of all the fibers, which are mutually parallel to one another, extend at an angle to the front face 96 of the mirror array 76. This angle is chosen so that the axes of the optical fibers are all perpendicular to the planes of the several mirror elements when the latter are tilted to their ON state. Thus, incoming light, as indicated by light ray 98a, striking a mirror element 90c, which is tilted to the ON state, is directed through the optical fibers to be precisely perpendicular to the plane of this mirror element, and thereby is retroreflected, as indicated by light ray 98b, back along the axes of the optical fibers, as shown in FIG. 6.

With the mirrors in the OFF state, as shown in FIG. 7, an incoming light ray 98a impinges upon a mirror element 90c that is now tilted through an angle of about 20° with respect to the plane of the same element in its ON state. Accordingly, light is reflected from this OFF state mirror element, as indicated by light ray 98c, at a significant angle (in the order of 40°) to the direction of the incident illuminating light, and, of course, also at a similar angle to the axis of the optical fiber. Since each optical fiber has an acceptance angle that is smaller than the illustrated 40° (an acceptance angle of approximately 20°, for example, for a fiber numerical aperture of 0.35, light reflected from any of the micromirrors that are tilted to the OFF position is blocked by the wedge-shaped fiberoptic face plate. Accordingly, the wedge-shaped fiberoptic face plate, configured and positioned as described above and illustrated in FIG. 5, acts as an aperture stop for all unwanted reflected light and will pass to the projection lens only that light which is retroreflected within the very small acceptance angle of the optical fibers directly from those of the mirrors that are in the ON position. There may be several fibers for each of the mirrors in the closely compacted fiber bundle. The dispersal within the bundle of some non-transmitting or black fibers enhances the operation of the fiberoptic face plate as a light blocking aperture stop.

In addition to providing an effective aperture stop, the described use of the wedge-shaped fiberoptic face plate has a number of additional advantages. Because the axes of the fibers all are aligned with the axis of the projection lens, the retroreflected light from the ON state mirrors is coincident with the projection lens axis. This described arrangement moves the plane of the image formed by the mirror array from the inner surface 80 of the face plate to the outer surface 82 of the face plate. The inner surface 80 of the face plate and the plane of the mirror array are not perpendicular to the projection axis, but the outer face 82 is precisely perpendicular to the projection lens axis. It is upon this outer face 82 of the fiberoptic face plate that the image is formed. (Without the face plate, as in the prior art, the image is formed on the face of the mirror array.) Thus, the image plane, because of the wedge-shaped fiberoptic face plate, is perpendicular to the direction of the projected light, thus greatly minimizing image keystone distortion. The arrangement also enhances image system focus and color purity. Because the incoming and outgoing light are effectively coaxial at the outer face 82 of the face plate, the projection lens may be positioned closer to the mirror array, and thus a more compact system is obtained.

Figure 8:
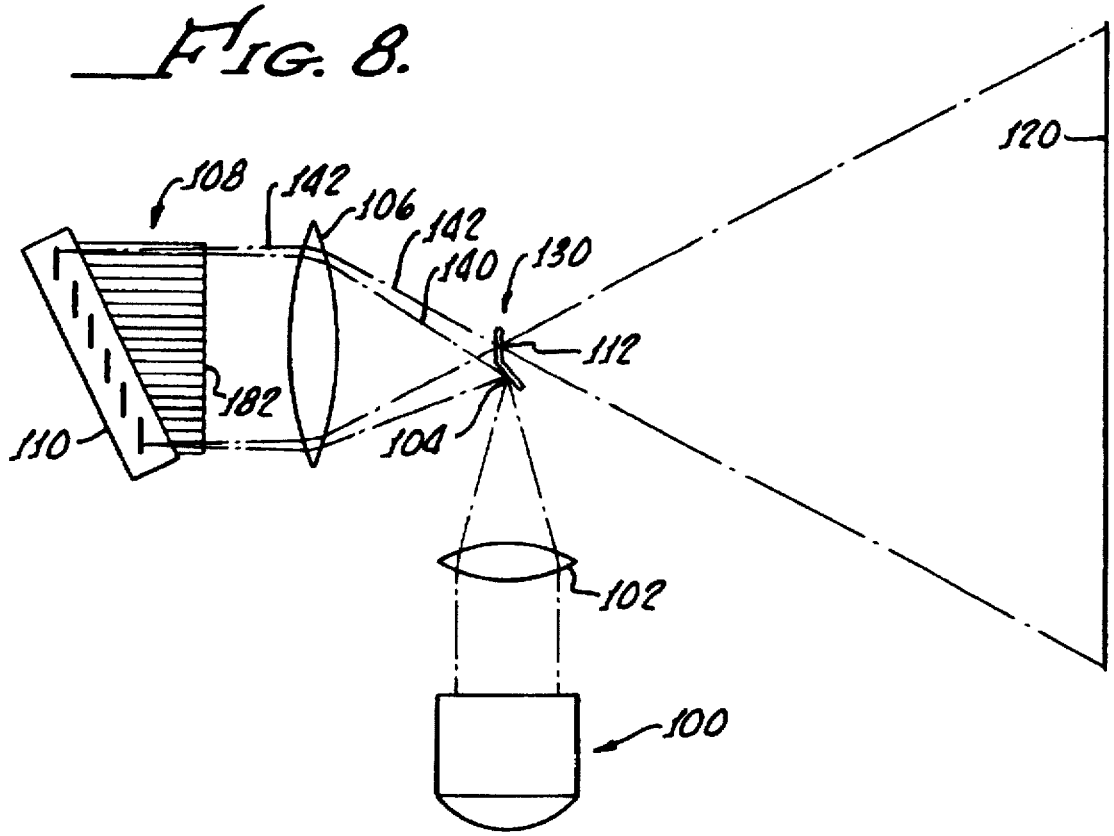
FIG. 8 shows a modified version of the system of FIG. 5, illustrating a different way to distinguish illuminating input beams and the output projection beam.

It will be understood that other arrangements are well known to those skilled in the art that may be used to replace separator 70 and still effectively separate the incoming illumination light from the outgoing projection light. One such alternative arrangement is illustrated in FIG. 8, which shows schematically a light source 100, sending light through a condenser lens 102 to a focal point 104 where it is reflected through substantially 90° to a projection lens 106, and thence through a wedge-shaped fiberoptic face plate 108, which may be identical to the wedge-shaped fiberoptic face plate 78 of FIG. 5. Focal point 104 effectively forms a point light source. The illumination light is transmitted axially of the fibers of the face plate 108 to the several mirrors of a mirror array 110, which may be identical to the mirror array 76 of FIG. 5. Light effectively retroreflected from the ON state mirrors of the display is transmitted through the fibers of the face plate to the projection lens. The latter has a focal point 112 which is close to, but spaced from, the focal point 104 of the light source. The retroreflected light passing through the projection lens is then imaged upon a screen 120.

Figure 9:
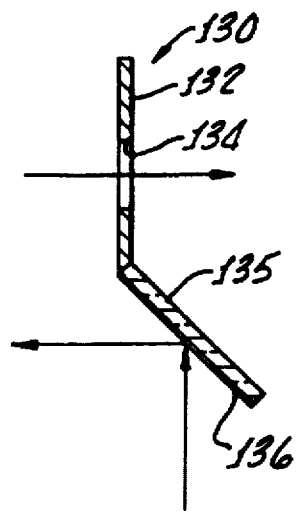
FIG. 9 shows a combined aperture stop and reflector for the embodiment of FIG. 8.

In the arrangement of FIG. 8 separation of the incoming illuminating light from the outgoing projection light is accomplished by a light separator 130 illustrated in further detail in FIG. 9. Separator 130 forms a combined mirror and aperture stop in which the mirror is slightly displaced from the optical axis of the projection lens to allow projected light to pass through the aperture stop. However, the mirror is close enough to the projection axis so that light reflected from the mirror portion of the combined mirror and stop is transmitted at as small an angle as possible relative to the optical axis of the projection lens group. The mirror may be quite small because it is very close to the focus of the incoming illumination light and positioned very close to the focal plane of the projection lens. As shown in FIG. 9, a single combined aperture stop and mirror surface 130 is formed from a single metallic sheet having a substantially vertical (as viewed in FIGS. 8 and 9) plate 132 formed with an aperture 134 that defines the projection lens aperture stop. The plane of this aperture stop is perpendicular to the optical axis of the projection lens. Integrally formed and fixedly connected to a lower portion (in this arrangement) of the aperture stop plate 132 is a small reflective plate 135 having a reflective surface 136 positioned at a suitable angle, near 45° for example, to the optical axis of the projection lens group and lying substantially in the focal plane of this projection lens group. The reflective surface 136 receives incoming light from the lens element 102 and reflects it, as indicated by rays 140, toward the mirror array through the projection lens 106. The latter acts to substantially collimate the incoming illumination light and passes it to the outer face 182 of the wedge-shaped fiberoptic face plate. The configuration is such that the angle between the incoming illumination light and the outgoing reflected projection light is so small that the retroreflected light, as indicated by rays 142, still lies within the small acceptance angle of the optical fibers. Thus both incoming illumination light and retroreflected projection light, as reflected from ON state mirrors, readily passes through the optical fibers.

If deemed necessary or desirable, the various angles illustrated may be modified slightly to compensate for refraction at the outer face 82 and inner face 78 of the wedge-shaped fiberoptic face plate.

There have been described methods and apparatus for improving the aperture stop of a miniature array of tiltable bi-stable miniature mirrors in which blocking of unwanted light is enhanced because of the relatively large angle between light reflected in ON and OFF mirror states, in which the mirror array image plane is made perpendicular to the projection axis, thereby aiding system focus, color purity and distortion, and in which an effective aperture stop separate and apart from the projection lens allows a more compact packaging of the system.

What is claimed is:

1. An imaging system comprising:

an array of mirrors, each mounted for tilting between an OFF position in which the mirror lies in a mirror plane that is parallel to a first plane and an ON position in which the mirror lies in a mirror plane that is parallel to a second plane that extends at an angle to said first plane, a drive for tilting selected ones of said mirrors between said ON and OFF positions, and a bundle of mutually parallel optical fibers having optical fiber axes perpendicular to said second plane, said bundle being positioned to direct input light through said fibers to said array of mirrors, and to direct light retroreflected from mirrors in said ON position back through said fibers, said fibers blocking light reflected from mirrors in said OFF position.

2. The imaging system of claim 1 wherein said bundle comprises a face plate having an image-forming surface that is perpendicular to said second plane.

3. The imaging system of claim 1 wherein said bundle of fibers comprises a wedge-shaped face plate having an inner face against said array and an outer face parallel to said second plane.

4. The system of claim 1 including a light source, a projection lens, and a separator interposed between said light source and said bundle and between said projection lens and said bundle for transmitting light from said source as said input light to said bundle and for transmitting to said projection lens said light retroreflected from mirrors in said ON state.

5. The system of claim 4 wherein said separator is a beam splitter.

6. The system of claim 1 including means for separating said retroreflected light from said input light.

7. The system of claim 1 including a light source positioned to project an input beam through said optical fibers to said mirrors, said light source having a focal point, and a projection lens positioned to project said retroreflected light upon a screen, said projection lens having a focal point closely adjacent to, but spaced from, said focal point of said light source.

8. The system of claim 1 wherein said array of mirrors lies in an array plane that extends at an angle to both said first and second planes, and wherein said bundle has a wedge shape.

9. The system of claim 1 wherein said bundle has an inner face closely adjacent to and parallel to said array and has an outer face parallel to said second plane, each said fiber of said bundle extending between said inner and outer bundle faces.

10. In an imaging system wherein mirrors of a mirror array are each tiltable between an OFF position in which each mirror lies in a mirror plane parallel to a first plane and an ON position in which each mirror lies in a mirror plane that is parallel to a second plane that extends at an angle to the first plane, wherein an illumination beam is projected from a light source to said mirrors for reflection from mirrors in said ON position as an output beam to a projection lens which projects the output beam upon a screen, an improved method for blocking light reflected from said mirrors in said OFF position, said improved method comprising the steps of:

forming a bundle of optical fibers, positioning said bundle of fibers adjacent said array with the axes of said fibers all parallel to one another and perpendicular to said second plane, directing light from said light source through said optical fibers to said array of mirrors, and directing light retroreflected from said mirrors in said ON position back through said fibers to said projection lens.

11. The method of claim 10 wherein said step of forming comprises forming a bundle of fibers having a small acceptance angle.

12. The method of claim 10 wherein said step of forming a bundle of optical fibers comprises the steps of securing a plurality of fibers together in the shape of a wedge having an inner face extending parallel to said array and having an outer face lying in a plane that is parallel to said second plane and extends at an angle to said array.

13. An imaging system comprising:

an array of tiltably mounted mirrors, drive means for selectively and individually tilting each of said mirrors between ON and OFF positions, each of said mirrors in its OFF position lying in a plane parallel to a first plane that extends at an angle to the plane of said array, and in its ON position lying in a second plane that extends at an angle to the plane of said array and to said first plane, a light source configured and arranged to project an illuminating light beam toward said array, a projection lens configured and arranged to receive light reflected from said array and to project the received reflected light or an image beam upon a screen, a wedge-shaped optical fiber face plate having an inner face positioned closely adjacent and extending parallel to said array and having an outer face lying in a plane parallel to said second plane, said face plate comprising a plurality of straight optical fibers extending between said inner and outer faces of said face plate, and means for separately directing said illuminating beam and image beam along different optical paths.

14. The apparatus of claim 13 wherein said means for separately directing beams along different optical paths comprises a beam splitter positioned between said light source and said face plate and between said projection lens and said face plate.

15. The apparatus of claim 13 wherein each of said fibers has an acceptance angle, wherein said projection lens has a focal point, wherein said light source comprises an effective point light source positioned to direct said illuminating beam in a first direction within said acceptance angle, and wherein said projection lens is positioned to project said output light beam at an angle with respect to said illuminating light beam and in a direction within said acceptance angle, said projection lens focal point being closely adjacent to, but spaced from, said point light source.

* * * * *

UNITED STATES PATENT AND TRADEMARK OFFICE
CERTIFICATE OF CORRECTION

PATENT NO. : 5,640,479

DATED : June 17, 1997

INVENTOR(S) : Ronald Hegg et al.

It is certified that error appears in the above-indentified patent and that said Letters Patent is hereby corrected as shown below:

Column 1, line 65: delete "time, in" and insert -- time. In --.

Column 4, line 66: delete "quiescent pescent position" and insert --to a quiescent position--.

Signed and Sealed this

Ninth Day of September, 1997

Attest:

BRUCE LEHMAN

Attesting Officer          Commissioner of Patents and Trademarks